June 27, 1944. N. S. REYNOLDS 2,352,343
SEAL
Filed Nov. 14, 1941
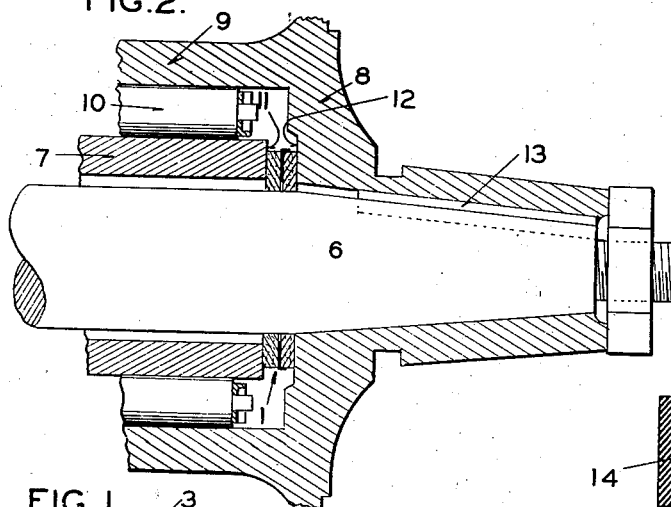
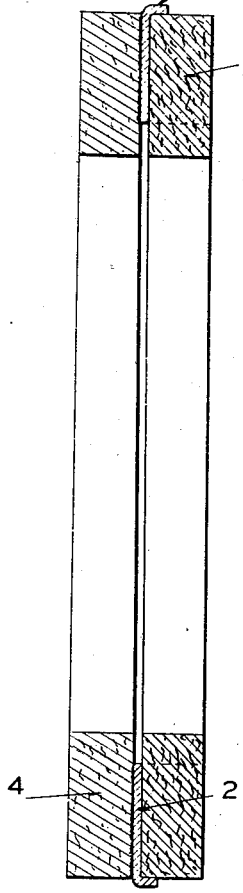
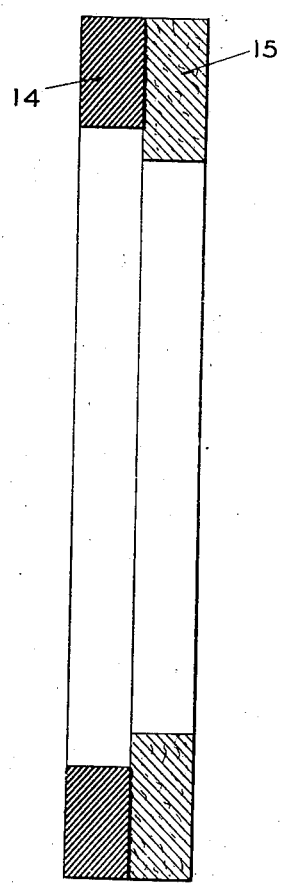
INVENTOR
N. S. REYNOLDS
BY P. H. Lamphere
ATTORNEY

Patented June 27, 1944

2,352,343

UNITED STATES PATENT OFFICE 2,352,343

SEAL

Noel S. Reynolds, St. Louis, Mo.

Application November 14, 1941, Serial No. 419,102

5 Claims. (Cl. 288—2)

My invention relates to seals and more particularly to a seal for use between two spaced surfaces lying in substantially parallel planes and having relative movement.

One of the objects of my invention is to produce an improved seal which is so constructed that when placed in operative position, the surfaces which have relative movement will be maintained in sealing engagement by the compressing of a material having an inherent resiliency and forming a part of the seal structure.

Another object of my invention is to so construct an improved seal for association with a rotatable shaft and a housing having parallel surfaces one or both of which being insufficiently smooth to provide a good sealing surface.

Still another and more specific object of my invention is to produce a seal, embodying means for engaging the surface of an axle or shaft to maintain said seal properly positioned, which is so constructed that it will permit said seal to be passed over a projecting key or spline on the axle or shaft to its installed position.

Other objects of my invention are to produce a seal of simple construction which can be economically manufactured from low cost material and one which will be efficient in operation over a long period of time.

Still other objects of my invention will become apparent from the following description taken in connection with the accompanying drawing in which Figure 1 is an enlarged sectional view of a seal embodying my invention; Figure 2 is a sectional view of an automobile axle construction showing, by way of example, a use of the seal; and Figure 3 is a sectional view of another construction embodying my invention.

Referring to Figure 1 in detail, the seal which is generally indicated by the numeral 1 comprises a thin annular control ring 2 which is made of a hard low friction material such as steel, bronze, other metals or alloys thereof, or a hard plastic material. This supporting ring is provided with a peripheral flange 3 which extends outwardly from one side of the ring at substantially right angles to the plane thereof.

On the side of ring 2 opposite flange 3 is a ring 4 of considerably greater axial thickness than ring 2. This ring 4 is made of a resilient material which can be axially compressed without permanent deformation. Examples of materials which can be used are fibrous materials such as felt. Also, soft rubber or synthetic rubber or the like can be employed. With such resilient material it is seen that this ring when compressed axially will exert axial forces in opposite directions. The ring 4 is secured to ring 3 by cement or joined by some other suitable means so that the two rings will not have relative rotation. The ring 4 has an internal diameter less than the internal diameter of ring 2 for a purpose which will be later apparent.

On the side of ring 2 from which flange 3 projects, there is positioned a third ring 5 which in the construction shown is of substantially the same axial thickness as ring 4 although it may have other dimensions. This third ring 5 can be made of fibrous material, examples of which are felt or leather. The ring need not be of material which has any appreciable axial compression although such characteristic is not undesirable. If the ring is made of felt, for example, the axial compressibility will probably be greater than if it were made of leather. The ring 5 is adapted to fit within flange 3 and when in this position the flange acts as a retaining wall and prevents radial expansion of the material of ring 5, especially adjacent ring 2. Ring 5 may have an internal diameter the same as ring 4 or, if desired, it can have the same internal diameter as ring 2, such internal diameter being shown by dotted lines. The ring 5 is not in any way secured to ring 2, thus permitting relative rotation between said ring 5 and said ring 2. If felt is used for ring 5, it should be slightly harder than that used in making ring 4, that is, the felt should be more tightly packed in order that it will have a good wear factor.

The seal just described may be used between any two parallel relatively rotatable surfaces which are substantially normal to the axis of rotation. By way of example, it is shown in Figure 2 as being employed in a rear axle construction of an automobile. In this axle construction the rotatable axle 6 is enclosed within a housing 7. Keyed on the outer end of the axle is a wheel hub 8 having an annular flange 9 in spaced surrounding relation to the end of the housing. Between the housing and the flange is a bearing 10 which is lubricated by grease maintained around said bearing. The end of the housing is provided with a flat surface 11 which has spaced therefrom a parallel surface 12 on the hub of the wheel. Between these two surfaces and cooperating therewith is positioned my improved seal 1 just described. This seal prevents any of the bearing grease from leaving the bearing and passing into the housing. It also prevents the thinner grease in the housing (coming from the differential gearing) from entering the bearing chamber and thinning the bearing grease. The surfaces 11 and 12 as they are found on the axle construction are somewhat rough, that is, they are not honed or polished surfaces.

The seal in its normal condition, as shown in Figure 1, has an over-all axial thickness somewhat greater than the axial distance between surfaces 11 and 12 of the axle construction. Thus, when the seal is mounted in position and the hub secured to the axle, the seal will be axially compressed, that is, the axial thickness of the seal will be decreased. This is permitted by the resiliency of the material of ring 4 and also by ring 5 but to a lesser degree. When the seal assumes the operative position shown in Figure 2, ring 4 will have pressure engagement with surface 11 and ring 5 will have pressure engagement with surface 12. Due to the slight roughness of surfaces 11 and 12, rings 4 and 5 will not have any relative movement with the engaged surfaces. The only relative movement will be between the surface of ring 5 and the surface of the hard ring 2 which it abuts. These surfaces have pressure engagement and because of this, there will be no appreciable leak of lubricant past them. Sufficient lubricant, however, will be present on the surfaces to render them lubricated which will decrease the friction therebetween.

When the seal is constructed as shown, for use in an axle construction, the internal diameters of rings 4 and 5 are the same, or slightly less than the diameter of the axle. Thus these rings hold the central ring 2 of non-yieldable material in concentric spaced relation with respect to the axle. The ring 2, being of an internal diameter less than the diameter of the axle, permits it to be passed freely over key 13 (or a spline) employed in holding the hub from relative rotation on the axle. Thus the key need not be removed from the axle to get the seal in place. When the hub is removed, the seal may be slipped over the key quite easily as the material of rings 4 and 5 will be displaced sufficiently, due to the material used, to permit them to pass over the key. When ring 5 has the same internal diameter as ring 2, assembly is further facilitated.

The seal may assume an operative position either in the position shown in Figure 2, or the reverse thereof, that is, with ring 5 engaging surface 11 and ring 4 engaging surface 12. In either position rings 4 and 5 will have such pressure engagement with the engaged surfaces 11 and 12 that they will not have any relative rotation with respect to the member carrying the engaged surfaces.

The seal will efficiently perform its sealing action over a long period of time as the resiliency of the material is sufficient to maintain all the surfaces in such pressure engagement that no appreciable leaking will occur. Also, because of the fact lubricant is permitted to be between the abutting surfaces of ring 5 and the hard ring 2, the relative rotation between such rings will not cause any serious heat problem which might deteriorate the material of ring 5.

The seal shown in Figure 3 comprises a ring 14 made of some hard material such as a carbonaceous material, for example, graphite or from "Oilite," a product made by pressing powdered bronze impregnated with lubrication and then baking. A second ring 15 is secured to ring 14 by cement or some other means. This ring is made of resilient material such as felt or soft rubber. Rings 14 and 15 are preferably of substantially the same axial thickness and their combined thickness is such that it is greater than the axial distance between the surfaces with which the seal cooperates. The ring 15 has such an internal diameter as to snugly engage the axle or other shaft which the seal surrounds. The ring 14 is of larger internal diameter in order that it can be passed over a key such as key 13 of Figure 2.

When this seal is used in an axle construction, as shown in Figure 2, it is desirable that the surface which is engaged by ring 14 be smooth or polished, since this ring is to have relative movement with such surface. The pressure engagement of the surface of ring 14 with the surface it engages is brought about by compressing the resilient material of ring 15. Thus, when the seal is used in the rear axle construction, surface 11 will be polished. The ring 15 of the seal, when axially compressed, will cause the seal to be held from rotation with respect to the hub by the engagement of ring 15 with the slightly rough surface 12 of the hub. By having ring 15 of an internal diameter to snugly engage the shaft, ring 14 will be maintained properly positioned concentric with the axis of the shaft or axle and in slightly spaced relation thereto. If it is desired that the seal be reversed with ring 14 engaging the surface 12 of the hub, such surface should be honed or otherwise polished.

From the foregoing description it is seen that both seals are very simple in construction and yet they will be very effective seals and efficient in operation. In both seals the pressure between the surfaces which have relative rotation is brought about by the compression of the resilient material of a ring forming a part of the seal structure. In the seal shown in Figure 1, the surfaces which have relative movement to each other are embodied in the seal itself and thus, it is not necessary that the two parallel surfaces with which the seal cooperates be smooth or polished. In the seal shown in Figure 3 one of the parallel surfaces between which the seal is positioned must be fairly smooth and this can be accomplished by honing the surface if it is not already smooth or polished. The sealing surfaces, however, are maintained in pressure engagement by the compressing of a ring of resilient material as in the seal of Figure 1. Both seals are constructed to be quickly installed, especially where an axle or a shaft is provided with a key or spline. The construction is also such that the non-yieldable ring, which carries a smooth surface for relative rotation to a cooperating surface, is maintained concentrically spaced from the axle or shaft when the seals are in operative position.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. A seal in the form of a unitary assembly adapted to be placed between two parallel surfaces carried by relatively rotatable members, said seal comprising a central ring of non-yieldable material having a smooth surface on one end and outer rings on opposite sides of said central ring, one of said outer rings being non-rotatably connected to the central ring on the end opposite the smooth surface and being made of a resilient material permitting axial compression, the other outer ring being in free abutment with the smooth surface of said central ring so as to permit relative rotation therebetween, the overall axial thickness of the rings being greater than the distance between the two parallel surfaces between which the seal is to be positioned in order that when the seal is in position the first named outer ring will be axially compressed to thereby maintain each outer ring in pressure engagement with a cooperating parallel surface and provide the sole means to prevent its relative movement with respect to the said engaged surface and also to cause the smooth surface of the central ring and the surface of the outer ring abutting it to have pressure engagement.

2. A seal adapted to be placed between two parallel surfaces one of which is carried by a shaft and the other by a housing member, said seal comprising a central ring of non-yieldable material having a smooth surface on one end and outer rings on opposite sides thereof, one of said outer rings being non-rotatably connected to the central ring on the end opposite the smooth surface and being made of a resilient material permitting axial compression, the other outer ring being in free abutment with the smooth surface of said central ring so as to permit relative rotation therebetween, the over-all axial thickness of the rings being greater than the distance between the two parallel surfaces between which said seal is to be positioned in order that when the seal is in position on the shaft the first named outer ring will be axially compressed to thereby maintain each outer ring in pressure engagement with a cooperating parallel surface and provide the sole means to prevent its relative movement with respect to the said engaged surface and also to cause the smooth surface of the central ring and the surface of the outer ring abutting it to have pressure engagement, said central ring being unconnected with and of greater internal diameter than the shaft and said first named outer ring being constructed of an internal diameter to engage the shaft surface so as to maintain the central ring concentrically spaced from the shaft.

3. A seal for use between two relatively rotatable parallel surfaces, said seal comprising a central ring of non-yieldable material having a smooth end surface and provided with a flange at its periphery extending outwardly from the smooth end, an outer ring having its peripheral portion snugly received within the flange and being in unsecured abutting engagement with the smooth surface, a second outer ring of resilient material permitting said ring to be axially compressed without permanently deforming said material, and means for connecting the last named ring to the central ring so that said rings will not have relative rotation.

4. A seal for use between two relatively rotatable parallel surfaces, said seal comprising a central ring of metal having a smooth end surface and provided with a flange at its periphery extending outwardly from the smooth end, an outer ring of fibrous material having its peripheral portion snugly received within the flange and being in unsecured abutting engagement with the smooth surface, a second outer ring of resilient fibrous material permitting said ring to be axially compressed without permanently deforming said material, and means for permanently securing the last named ring to the metal ring.

5. A seal for use between two relatively rotatable parallel surfaces, said seal comprising a central ring of metal having one of its end surfaces polished, an outer ring of leather having one smooth end surface for engaging the polished end surface of the central ring, a second outer ring of a resilient material permitting axial compression without permanent deformation, and means for securing said second ring to the end of the central ring opposite the polished end surface so that the two rings will rotate together, the over-all length of said three ring seal prior to being mounted in an operative position being greater than the axial distance between the two rotatable parallel surfaces in order that said second outer ring of resilient material may be axially compressed to thereby cause the outer rings to be in such pressure engagement with the relatively rotatable parallel surfaces engaged thereby as to cause each outer ring to rotate with the engaged surface.

NOEL S. REYNOLDS.